April 7, 1970 A. G. MUELLER ET AL 3,505,581
MALFUNCTION DETECTOR CIRCUIT FOR A SOLID STATE
ELECTRIC MOTOR CONTROLLED VEHICLE
Filed May 27, 1968

*INVENTOR.*

ARMAND G. MUELLER
ROBERT C. MONTROSS

BY *William H. Schmeling*

United States Patent Office 3,505,581
Patented Apr. 7, 1970

3,505,581
MALFUNCTION DETECTOR CIRCUIT FOR A SOLID STATE ELECTRIC MOTOR CONTROLLED VEHICLE
Armand G. Mueller, Wauwatosa, and Robert C. Montross, Mequon, Wis., assignors to Square D Company, Park Ridge, Ill., a corporation of Michigan
Filed May 27, 1968, Ser. No. 732,295
Int. Cl. H02k *17/32*
U.S. Cl. 318—434    10 Claims

ABSTRACT OF THE DISCLOSURE

A control which will detect shorting of the main power silicon controlled rectifier in a solid state electric vehicle system and interrupt the power circuit to the traction motor of the vehicle upon failure of the rectifier to properly control the current pulses to the motor.

---

The present invention relates to a failure detector circuit for a solid state direct current motor control circuit for an electric vehicle and is more particularly concerned with a circuit which will detect the failure of a silicon controlled rectifier to interrupt current flow to a motor vehicle traction motor after the rectifier has switched to a conductive state.

Electrically powered vehicles, such as battery operated trucks used in warehouses, are frequently provided with solid state type controls using silicon controlled rectifiers. A motor control circuit, as shown in a United States patent, Montross et al., 3,361,921, is typical of an apparatus that may be involved. In control circuits of the type herein contemplated, a power controlling silicon controlled rectifier is switched to a conductive state at regulated spaced time intervals by an adjustable firing and timing circuit and is switched to a non-conductive state a predetermined time interval after the rectifier is switched to a conductive state. The switching of the power controlling rectifier to a non-conductive state is accomplished by a commutating silicon controlled rectifier which is controlled by a firing circuit to deliver a charge on a capacitor through the power controlling rectifier in reverse to the conducting direction of the rectifier to thereby commutate the rectifier to its non-conductive state. While the circuit disclosed in the Montross et al. patent has been successfully used to control the operation of large size trucks which are capable of transporting heavy loads, a malfunction of the control may result in the delivery of full battery power to the motor when the control is initially activated. This will result in an abrupt start and uncontrolled acceleration of the truck until the truck operator regains control of the truck by manipulation of the master direction switch. Under many conditions a malfunction of this type will be without significance. However, under other situations, the malfunction may result in consequent damage to equipment and injury to personnel as may be envisioned when the truck is transporting a load consisting of sheets of plate glass, each having a size of more than one hundred square feet, which are stacked on the forks of the material handling truck.

One mode of failure of a silicon controlled rectifier is that the rectifier will fail in a conducting mode. When this type of failure occurs in a direct current motor circuit of a vehicle, the motor will be fully energized by uncontrolled power form the vehicle battery. Another type of failure which may be experienced is an uncontrolled switching alternately between a conductive and non-conductive state of the rectifier which delivers the power current pulses to the traction motor. In this type of failure the motor will be energized by power which greatly exceeds the power setting of the acceleration control of the vehicle in spite of the fact that the power delivering rectifier conduction is properly commutated by conduction of the turn-off silicon controlled rectifier in the control.

It is therefore an object of the present invention to provide a circuit in a solid state control circuit for an electric vehicle which will disconnect the motor from its power supply in event conditions prevail where control of the current flow to the motor is lost by the control circuit.

Another object is to provide a circuit in a control circuit for a battery operated vehicle which will disconnect the control circuit and the motor from the battery supply when the rate of conduction of a silicon controlled rectifier exceeds a preselected value.

An additional object is to provide a circuit in a solid state control circuit for a battery powered vehicle with a current transformer which is energized by pulses of current to the motor and supplies alternating opposite polarity signal pulses in response to the initiation and the termination of each pulse to the motor and to use the opposite polarity signal pulses to control the charging and the discharging of a capacitor in a timing means which supplies an output signal to actuate a device for interrupting the circuit between the battery and the motor when the time interval between the opposite polarity pulses exceeds a predetermined value.

Further objects and features of the invention will be readily apparent to those skilled in the art from the specification and appended drawing illustrating certain preferred embodiments in which.

Figure 1:
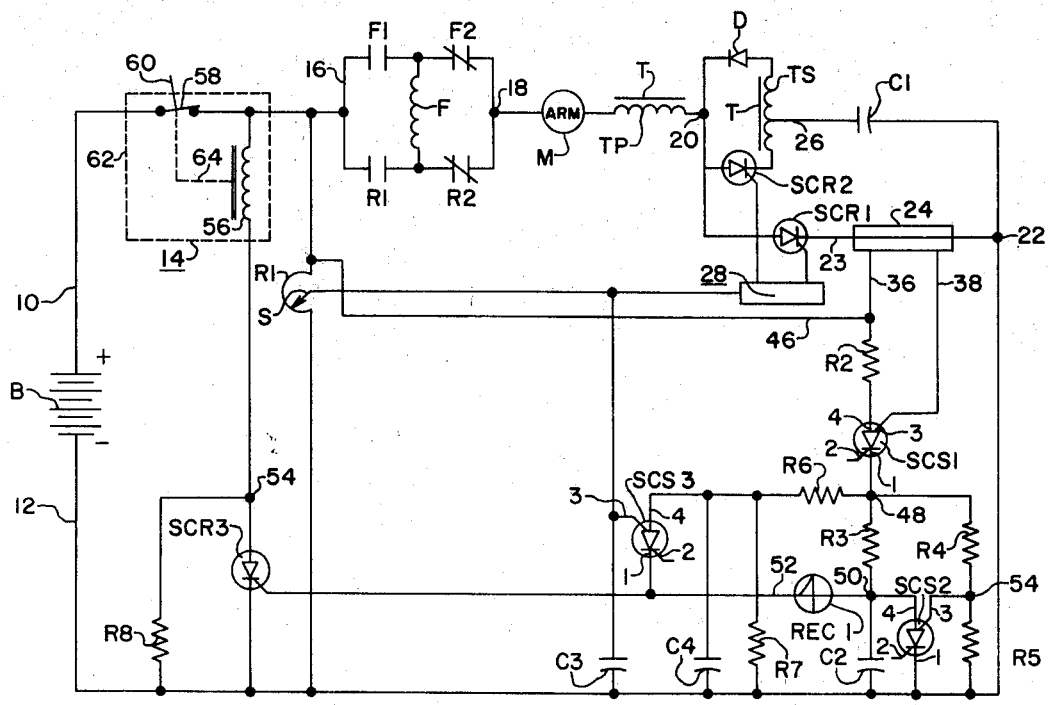
FIG. 1 shows a schematic wiring diagram of a direct current motor control circuit incorporating the features of the present invention.
Figure 2:
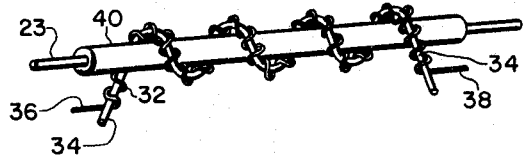
FIG. 2 is a view illustrating the constructional details of a current sensing transformer used in the circuit shown in FIG. 1.
Figure 3:
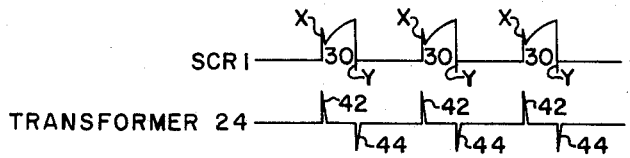

FIG. 3 graphically illustrates the pulses of direct current energizing the motor in FIG. 1 and the pulse output of the current sensing transformer shown in FIG. 2.

Referring to FIG. 1, a battery B has a positive terminal connected to supply a lead 10 and a negative terminal connected to supply a lead 12. The battery B acts as a source of direct current to supply a field winding F and an armature winding ARM of a direct current motor M that may serve as a traction motor for a battery powered vehicle, such as an industrial type truck. The lead 10 is connected through switch contacts of a shunt trip type circuit breaker 14, as will be later described, to a directional control circuit 16 for the field F. The directional control circuit 16 is of a conventional type, the operation of which is well known and includes forward and reversing contacts F1, F2 and R1, R2, and an output terminal 18 that is connected through the armature ARM and a primary winding TP of a transformer T to a junction 20. The junction 20 is connected through a pair of parallel circuits to a junction 22. One of the parallel circuits includes a silicon controlled rectifier SCR1, a lead 23 and a current sensing transformer indicated by a numeral 24, as will be later described. The other parallel circuit includes a diode D, a silicon controlled rectifier SCR2, a secondary winding TS of the transformer T and a capacitor C1. The diode D is connected between the junction 20 and one of the end terminals of the secondary windng TS in a direction to pass current from the secondary winding TS to the junction 20. Similarly, the rectifier SCR2 is connected between another of the end terminals of the secondary winding TS in a direction to pass current from the junction 20 to the secondary winding TS.

The secondary winding TS is provided with an intermediate tap 26 which is connected to one side of the capacitor C1. The capacitor C1 has its second side connected to the junction 22. The circuit shown in FIG. 1 also includes a potentiometer resistor R1 that is connected across the leads 10 and 12. The resistor R1 has a slider S connected to supply an input to the oscillator module designated by a numeral 28. The oscillator module 28 supplies signals to the gate electrodes of the rectifiers SCR1 and SCR2 which will sequentially switch the rectifiers to a conductive state.

The circuit thus far described, with the exception of the shunt trip circuit breaker 14 and the current transformer 24, is fully disclosed in United States Patent 3,361,921 which issued on Jan. 2, 1968, and is assigned by the inventors Robert C. Montross and John P. Cooper to the assignee of the present invention. As disclosed in the Montross et al. patent, the oscillator module 28 controls the sequential switching of the rectifiers SCR1 and SCR2 so the motor M is supplied with pulses of direct current from the battery B at a frequency determined by the adjustment of the slider S of the resistor R1. When the circuit is initially energized, the oscillator module 28 supplies a suitable signal to the gate electrode of the rectifier SCR2 which switches the rectifier SCR2 to a conductive state and causes the capacitor C1 to be charged in a direction making the tap 26 side of the capacitor C1 positive in polarity. The charge on the capacitor C1 making the tap 26 side positive is called a precharge and causes the rectifier SCR2 to switch to a non-conductive state when the precharge potential across the capacitor C1 equals the potential of the battery B. Subsequent to the establishment of the precharge on the capacitor C1, the oscillator module 28 supplies a suitable signal to the gate electrode of the rectifier SCR1 which causes the rectifier SCR1 to switch to a conductive state. The conducting rectifier SCR1 provides a discharge path for the precharge on the capacitor C1 through a circuit that includes the tap 26, the winding TS of transformer T, the diode D, the junction 20, the rectifier SCR1, the lead 23 and the junction 22. The conducting rectifier SCR1 also causes current to flow from the battery B through the closed contacts of the circuit breaker 14, the properly closed contacts of the reversing circuit 16 including the field F, the armature ARM, the primary winding TP, the junction 20, the conducting rectifier SCR1, the lead 23, the junction 22 and the lead 12, thereby supplying the field F and the armature ARM with current. The current flow through the primary winding TP causes the secondary winding TS to supply an output which charges the capacitor C1 to a value exceeding the potential of the battery B in a direction making the junction 22 side of the capacitor C1 positive. The circuit for charging the capacitor C1 includes the secondary winding TS, the diode D, the junction 20, the conducting rectifier SCR1, the lead 23, and the junction 22. The charge on the capacitor C1 which causes the junction 22 side to have a positive polarity is designated as a commutating charge.

A fixed time interval after the rectifier SCR1 has switched to a conductive state and the commutating charge on the capacitor C1 has been established, the oscillator module 28 again supplies a signal to the gate electrode of the rectifier SCR2 to switch the rectifier SCR2 to a conductive state.

When the rectifier SCR2 switches to a conductive state, two circuit paths are provided to discharge the current energy of the commutating charge that is impressed on the capacitor C1. One path includes the junction 22, the lead 23, the cathode to anode of the rectifier SCR1, which is in a conducting state, the anode to cathode of the conducting rectifier SCR2, the secondary winding TS and the tap 26. The second path includes the junction 22, the lead 12, the battery B, the closed contacts of the circuit breaker 14, the reversing circuit 16 including the field winding F, the armature ARM, the winding TP, the junction 20, the anode to cathode of the conductor rectifier SCR2, the winding TS, and the tap 26. As is well known, the preferred path of current flow is along the lines of least resistance and the first path described exhibits the lower resistance of the two paths since it includes the conducting rectifier SCR1, the conducting rectifier SCR2, the winding TS and the lead inductances of the connecting leads as described. The second path includes the field winding F, which has a low ohmic resistance and a high inductive impedance which tends to prevent an increase in current flow through the second path from the discharging capacitor C1 in a manner well known to those skilled in the art. It can be seen that the the preferred path of discharge flow for the commutating charge on the capacitor C1 is through the rectifier SCR1 in a direction opposite to the current flow to the armature ARM which is flowing through the rectifier SCR1 in response to an earlier switching signal from the oscillator module 28. The commutating current flow from the capacitor C1 through the rectifier SCR1 cancels all the conducting charge carriers in the rectifier SCR1 and causes the rectifier SCR1 to switch to a non-conductive state.

After the rectifier SCR1 switches to a non-conductive state and the rectifier SCR2 continues in a conducting state, the second path becomes the preferred path to discharge the remaining commutating charge on the capacitor C1. The rectifier SCR2 continues to conduct until the commutating charge on the capacitor C1 is dissipated and the polarity of the capacitor C1 is completely reversed and has risen to approximately the potential of the battery B to provide the precharge on the capacitor C1 as described.

An adjustable time interval after the rectifier SCR2 has switched to a non-conductive state, the oscillator module 28 again supplies a signal which causes the rectifier SCR1 to again switch to a conductive state and supply a pulse of current to the field F and the armature ARM to repeat the cycle as above. The circuitry of the oscillator module 28 is arranged so the time intervals of pulses of current to the motor M, as caused by the conduction of the rectifier SCR1, are equal and fixed in their duration and the intervals between each pulse of current to the motor M as caused by each non-conducting period of the rectifier SCR1 are variable as determined by the setting of the slider S on the resistor R1. Thus each time the rectifier SCR1 conducts, the motor M is energized with a pulse of current of predetermined time duration and the frequency of the energizing pulses to the motor M is adjustable and dependent upon the setting of the slider S, which acts as the speed selector means. The foregoing is illustrated by the curve SCR1 in FIG. 3, wherein the pulses designated by the numeral 30 indicate the current flow through the rectifier SCR1 and wherein the positive polarity spikes X appearing at the beginning of each pulse 30 designate the current flow provided by the precharge on the capacitor C1 and the negative polarity spikes appearing at the end of each pulse 30, designated as Y, indicate the current flow through the rectifier SCR1 which results as the commutating charge on the capacitor C1 causes a sweep-out of the conducting carriers in the rectifier SCR1.

While silicon controlled rectifiers have been found to be extremely reliable in their operation, they are subject to failure if subjected to abnormal temperatures or high transient voltages, etc., and in the circuit described, two modes of failure are possible. One of the modes of failure which may be encountered is that the silicon controlled rectifier fails in a shorted conducting mode wherein the anode to cathode junction loses ability to regain forward voltage blocking after turnoff. Thus in the event the rectifier SCR1 fails in a shorted conducting mode, the motor M will be energized with the maximum uncontrolled current for maximum speed and torque operation of the motor M during a period when the setting of the speed adjusting slider S requires the motor to operate under controlled speed conditions. Another mode of failure of a silicon controlled rectifier is that it will conduct whenever the potential between its anode and cathode exceeds a predetermined value, regardless of the potential between the gate and cathode electrodes. When this type of failure occurs, the rectifier SCR1 will switch to a conductive state and be commutated to a non-conductive state by the discharge of the commutating charge on the capacitor C1 when rectifier SCR2 conducts. However, as soon as the rectifier SCR2 ceases conducting, the rectifier SCR1 will again switch to a conductive state independently of the control which is normally provided by the oscillator module 28 and energize the motor M with maximum frequency current pulses even though the slider S is adjusted for operation of the motor M at a much lower speed.

Included in the circuit in FIG. 1 are solid state devices known as silicon controlled switches which are designated by numerals SCS1, 2 and 3, as well as a silicon controlled rectifier SCR3. The characteristics and structure of the silicon controlled switches are disclosed in Chapter 16 of the General Electric Company's "Transistor Manual," copyright 1964 Edition. Basically, a silicon controlled switch is a PNPN type structure with all four semiconductor regions available through electrodes called an anode 4, an anode gate 3, a cathode 1 and a cathode gate 2, and behaves like two complementary transistors in a regenerative feedback configuration. Also included in the circuit is the current sensing transformer 24 having a structure more fully disclosed in an application for United States patent, Ser. No. 732,296, filed May 27, 1968, and assigned by the inventor Robert C. Montross to the assignee of the present invention.

The construction of the current sensing transformer as illustrated in FIG. 2 is best explained in terms in which it may be manufactured. Initially, a relatively thin conducting wire 32, having an insulating covering, is helically wound upon a relatively thin iron magnet wire 34 so that the conducting wire 32 provides a pair of output leads 36 and 38. The iron wire 34 with the conducting wire 32 helically wound thereon is then helically wound about a relatively straight section of the lead 23 which also has an insulating covering 40. When the current sensing transformer is thus formed, the lead 23 acts as a primary winding, the helically wound magnet iron wire 34 acts as a core for the transformer, and the helically wound wire 32 acts as a secondary winding.

When the current sensing transformer is formed as described and included in the circuit shown in FIG. 1, it will provide output signals as shown in the curve designated as transformer 24 in FIG. 3. That is, the pulses 30 of direct current as caused by the conduction of the rectifier SCR1 will energize the lead 23 which acts as a primary winding and cause the secondary winding wire 32 to deliver a sharp positive voltage pulse 42 at the beginning of each pulse 30 before the iron wire core 34 saturates and a sharp negative pulse 44 at the end of each pulse 30 as the iron wire core 34 desaturates.

The switch SCS1 has an anode 4 connected through a resistor R2 to the lead 36 and to the positive terminal of the battery B by a lead 46, an anode gate 3 connected to the lead 38 and a cathode 1 connected to a junction 48. The junction 48 is connected through a resistor R3 to a junction 50 and a lead 51. A capacitor C2 is connected between the lead 12 and the junction 50. The junction 50 is connected through a Shockley type diode REC1 and a lead 52 to the gate of the rectifier SCR3. Connected in parallel with the resistor R3, the junction 50, and the capacitor C2 between the junction 48 and the lead 12 is a series circuit including a resistor R4, a junction 54 and a resistor R5. The switch SCS2 has an anode 4 connected to the junction 50, an anode gate 3 connected to the junction 54, and a cathode 1 connected to the lead 12. The switch SCS3 has a cathode 1 connected to the gate of the rectifier SCR3 through the lead 52, an anode gate 3 connected to a junction between the slider S and one side of a capacitor C3 that has its other side connected to the lead 12 and an anode 4 connected through a resistor R6 to the junction 48. A resistor R7 and a capacitor C4 each have one side connected to the lead 12 and a second side connected to the anode 4 of the switch SCS3 and through the resistor R6 to the junction 48. The rectifier SCR3 has its gate connected to the lead 52, a cathode connected to the lead 12 and an anode connected through a junction 54 and an operating coil 56 and the switch contacts 58 of the shunt trip relay 14 to the lead 10. A resistor R8 is connected between the junction 54 and the lead 12 in parallel with the anode to cathode of the rectifier SCR3.

Devices of the type indicated as the shunt trip circuit breaker 14 in FIG. 1 are well known and commercially available from various manufacturers. Conventionally, circuit breakers comprise separable contacts, an over-center type spring operating mechanism which is operable by a manually manipulatable handle for opening and closing the contacts and a current responsive trip mechanism for releasably latching the operating mechanism. The tripping mechanism functions to release the operating mechanism to open the contacts upon a current overload condition. Additionally, shunt trip circuit breakers include an operating magnet coil which when energized functions to release the operating mechanisms to effect a rapid separation of the contacts. In the circuit breaker 14 a handle 60 is externally accessible of a housing 62 of the circuit breaker which is depicted by broken lines to open the switch contacts 58 to manually disconnect the battery B from the control circuit shown in FIG. 1. The coil 56, when energized, will actuate a suitable mechanism within the circuit breaker housing 62 to effect a rapid separation of the contacts 58. The mechanism for causing the separation of the contacts 58 when the coil 56 is energized is depicted by the broken line 64.

When the switch contacts 58 are closed and the motor M is energized, the rectifier SCR1 supplies pulses of current through the lead 23. The current sensor 24 in response to the current pulses through the lead 23 supplies the lead 36 with the positive polarity pulse 42 each time the rectifier SCR1 switches to a conductive state and the negative polarity pulse 44 when the rectifier SCR1 switches to a non-conductive state. The positive polarity pulse 42 from the lead 36 which is impressed on the switch SCS1 anode 4 causes the switch SCS1 to conduct and the capacitor C2 to charge through the resistor R3. At the end of each pulse 30, the current sensor transformer 24 supplies the lead 36 with a negative polarity pulse 44 which causes the switch SCS1 to switch to a non-conductive state. During normal operation of the circuit including the conducting periods of the rectifier SCR1, and because of the selected values of R3 and C2, the charge of the capacitor is less than the breakdown voltage of the rectifier REC1, which is a four layer solid state diode sometimes referred to as a Shockley diode, and the rectifier REC1 does not conduct. However, in the event the rectifier SCR1 does not switch to a non-conductive state within a predetermined time interval which is greater than the time duration of the pulses 30, the absence of the negative pulses 44 will permit the switch SCS1 to continue to conduct and the capacitor C2 will continue to charge. When the charge on the capacitor C2 exceeds the breakdown voltage of the rectifier REC1, the rectifier REC1 conducts and delivers a pulse of positive polarity current through the lead 52 to the gate of the rectifier SCR3. The positive polarity current pulse from the lead 52 causes the rectifier SCR3 to switch to a conductive state and the coil 56 to be energized. Because of the inductive nature of the circuit including the coil 56, the resistor R8 provides a path for minimum current necessary to insure switching of the rectifier SCR3 into a conductive state upon receipt of a positive gate signal on lead 52. The energized coil 56 in turn trips the circuit breaker 14 and causes the switch contacts 58 to open so that the circuit which energizes the motor M and the circuitry which detected the improper conduction of the rectifier SCR1 is disconnected from the battery B. The shunt trip circuit breaker 14, as is customary with all conventional circuit breakers, is arranged so the contacts 58 may be closed, after the breaker is tripped, only by manually moving the operating handle 60 to a reset position which will permit operation of the vehicle driven by the motor M only after the breaker 14 is manually reset by the vehicle operator.

The switch SCS2 is included in the circuit to provide a discharge path for the charge on the capacitor C2 when the switch SCS1 becomes non-conductive so that the timing function of the capacitor C2 will be identical for each current pulse 30. The switch SCS2 is basically connected in the circuit to operate as a unijunction transistor. When the switch SCS1 becomes non-conductive, the potential at the junction drops toward the potential of the lead 12 while the potential at the junction 50 remains positive in polarity and unchanged because of the charge on the capacitor C2. The positive polarity at the junction 50 causes the switch SCS2 to become conductive and thereby provides a discharge path for the capacitor C2 through the anode 4 to cathode 1 of the switch SCS2. An advantage provided by the solid state switch SCS2 instead of a unijunction transistor in the circuit is the actual potential required to trigger the switch SCS2 to a conductive state during the timing cycle can be controlled and is proportional to the potential appearing at the junction 54 as determined by the values of the resistors R4 and R5. During the interval when the switch SCS1 is conducting, the resistors R4 and R5 act as a voltage divider making the potential at the junction 54 higher than the potential at the junction 50 which prevents SCS2 from switching on and allows the capacitor C2 to charge towards the potential which will cause the rectifier REC1 to conduct. For normal current pulses the switch SCS1 will switch to non-conducting state before the capacitor C2 reaches the firing potential of REC1. When the switch SCS1 becomes non-conductive, the potential drop across resistors R4 and R5 drops to zero so that the potential at the junction 54 approaches the potential of the lead 12 which permits the charge on the capacitor C2 to trigger the switch SCS2 to a conductive state and provide a discharge path for the charge on the capacitor C2, thus giving complete reset of the timing function for each cycle of operation of the switch SCS2.

If desired, an added safety circuit including the switch SCS3, the capacitors C3 and C4, and the resistors R6 and R7 may be included in the circuit to compare the actual frequency of the pulses 30 with the frequency required by the setting of the slider S. As was previously indicated, the position of the slider S controls the operation of the oscillator module 28 and when the slider S is positioned adjacent the lead 10 side of the resistor R1, the oscillator module 28 will deliver signals to the rectifier SCR1 which will provide a maximum frequency of current pulses 30 and therefore cause the motor M to have a maximum speed and torque output. Similarly, when the slider S is positioned adjacent the lead 12 side of the resistor, the rectifier SCR1 will conduct current pulses 30 at a minimum frequency so the motor M will operate at its lowest speed and deliver minimum torque. The capacitor C3 is connected between the slider S and the lead 12 so the charge on the capacitor C3 is a function of the position of the slider on the resistor R3. The slider S side of the capacitor C3 is connected to the anode gate 3 of the switch SCS3. The capacitor C4 and the resistor R7 are connected to the anode 4 of the switch SCS3 and through the resistor R6 and the junction 48 to the cathode 1 of the switch SCS1. As was previously described, the frequency of conduction of the switch SCS1 is identical to the frequency of conduction of the rectifier SCR1. Thus as the capacitor C4 receives a pulse of charging current whenever the switch SCS1 conducts, the charge on the capacitor C4 will be a function of the percentage conduction of the rectifier SCR1. The resistors R6 and R7 and the capacitor C4 are selected so that the charge on the capacitor C4 is less than the charge on the capacitor C3 during normal operation of the circuit so the switch SCS3 is not switched to a conductive state when the frequency of the pulses 30 corresponds to the adjustment of the slider S. Further, the charging and discharging circuit paths for the capacitor C4 including the resistor R7 are selected so for normal circuit operation, the charge on the capacitor C4 will not exceed the charge on the capacitor C3 when the slider S is rapidly moved in either direction over its full range on the resistor R1. However, should the rectifier SCR1 fail in a mode which will cause the rectifier SCR1 to conduct whenever the potential between its anode and cathode exceeds a predetermined value regardless of the potential between its gate and cathode, then the rectifier SCR1 will switch to a conductive state automatically and be commutated to a non-conductive state by the discharge of the commutating charge on the capacitor C1 when the rectifier SCR2 conducts. This type of failure of the rectifier SCR1 will cause the motor M to be energized by maximum frequency current pulses 30 even though the slider S is adjusted for operation of the motor M at a much lower speed. Further, this type of failure will not be detected by the circuit including the capacitor C2 and the rectifier REC1 because the frequency of the pulses 30 correspond to the normal operation of the circuit when the slider S is adjusted for maximum motor M speed and torque.

Under conditions when the frequency of the pulses 30 exceeds the required frequency as determined by the adjustment of the slider S, the capacitor C4 charge will rise to a value greater than the charge on the capacitor C3 and the switch SCS3 will switch to a conductive state and supply a positive polarity pulse through the lead 52 to the gate of the rectifier SCR3. The rectifier SCR3 in response to the positive polarity pulse switches to a conductive state and causes the coil 56 to open the switch contacts 58 in a manner and for the purpose previously described.

An additional advantage achieved by the control circuit as described includes the use of a shunt trip type circuit breaker 14 in the system. When the shunt trip circuit breaker is used, the excess current responsive devices normally used in the breaker may be omitted if desired, so the breaker response will be dependent upon the energization of the shunt coil. Further, as the circuit breaker additionally operates as a manually operated switch and its contacts are located in the circuit to disconnect the battery from the entire electrical system of the vehicle which is disclosed herein, if the breaker is located on the vehicle to be conveniently accessible to the vehicle operator, the breaker can serve as a convenient ON and OFF switch for the electrical system of the vehicle.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A control system for a direct current motor comprising: a direct current source, a silicon controlled rectifier connected in a circuit between the source and the motor, means for causing the rectifier to be switched alternately between a non-conductive and a conductive state for supplying the motor with spaced power pulses of direct current from the source through the circuit, means energized by the power pulse current flow in the circuit for supplying alternating opposite polarity signal pulses in response to the initiation and the termination of each power pulse, timing means controlled by the signal pulses for supplying an output signal whenever a time interval between the opposite polarity signal pulses exceeds a preselected value, and means actuated by the output signal for interrupting the circuit between the source and the motor in response to an output signal from the timing means.

2. The control system as recited in claim 1 wherein the circuit between the source and the motor includes a substantially straight length portion of a conductor and the means supplying the signal pulses includes a current sensing transformer that has a helical magnet wire core surrounding the straight length portion of the conductor, and a helical secondary winding surrounding a helical portion of the helical core.

3. The control system as recited in claim 1 wherein the means for interrupting the circuit between the source and the motor includes a circuit breaker that has a trip actuating coil for actuating a pair of separable contacts for disconnecting the source from the motor and the control system.

4. The control system as recited in claim 3 wherein the contacts of the circuit breaker are manually operable for manually disconnecting the source from the motor and the control system.

5. The control system as recited in claim 2 wherein the means for interrupting the circuit between the source and the motor includes a circuit breaker that has a trip actuating coil for actuating a pair of separable contacts for disconnecting the source from the motor and the control system.

6. The control system as recited in claim 1 the means for causing the rectifier to be alternately switched between a conductive and a non-conductive state includes means for adjustably controlling the ratio between the conductive and the non-conductive periods of the rectifier and the control system includes a comparison means controlled by the signal pulses and the means for controlling the ratio of the conductive periods of the rectifier for supplying an output signal when the ratio of the actual conductive periods of the rectifier exceeds the ratio determined by the adjustable control means by a preset value and the means for interrupting the circuit between the source and the motor is actuated by the output signals from the comparison means and the timing means for interrupting the circuit in response to either output signal.

7. The control system as recited in claim 2 wherein the timing means includes a silicon controlled switch that has a pair of control electrodes connected to receive output signal pulses from the secondary winding.

8. The control system as recited in claim 1 wherein the timing means includes a timing capacitor and a silicon controlled switch having a pair of control electrodes connected to receive the signal pulses for initiating charging of the capacitor in response to a signal pulse of one polarity and for terminating the charging of the capacitor in response to a signal pulse having a polarity opposite the said one polarity.

9. The control system as recited in claim 6 wherein the comparison means includes a pair of chargeable capacitors and a silicon controlled switch wherein one of said capacitors is charged by the means which controls the ratio between the conductive and non-conductive periods of the rectifier and the charge on the other of said pair of capacitors is controlled by the signal pulses and the silicon controlled switch has a pair of electrodes connected to compare the charges on the capacitors.

10. The control system as recited in claim 8 wherein the timing means includes a second silicon controlled switch having electrodes connected to provide a discharge path for the capacitor when the charging of the capacitor is terminated by the first mentioned silicon controlled switch.

References Cited

UNITED STATES PATENTS

| 3,308,391 | 3/1967 | McNamee | 307—202 |
| 3,342,309 | 10/1967 | Dannettell | 318—341 |
| 3,398,325 | 8/1968 | Shaffer | 307—202 |

BENJAMIN DOBECK, Primary Examiner

L. L. HEWITT, Assistant Examiner

U.S. Cl. X.R.

307—202

PO-1050
(5/69)

UNITED STATES PATENT OFFICE
CERTIFICATE OF CORRECTION

Patent No. 3,505,581          Dated April 7, 1970

Inventor(s) Armand G. Mueller et al

It is certified that error appears in the above-identified patent and that said Letters Patent are hereby corrected as shown below:

Col. 1, line 67, for "form" read --from--

Col. 7, line 18, after "junction" insert --54--

SIGNED AND
SEALED
AUG 4 - 1970

(SEAL)
Attest:

Edward M. Fletcher, Jr.
Attesting Officer

WILLIAM E. SCHUYLER, JR
Commissioner of Patent